(12) United States Patent
Wang et al.

(10) Patent No.: US 11,417,002 B2
(45) Date of Patent: *Aug. 16, 2022

(54) IMAGE RECOGNITION SYSTEM, SENSOR MODULE, AND METHOD FOR IMAGE RECOGNITION

(71) Applicant: PIXART IMAGING INC., Hsin-Chu (TW)

(72) Inventors: Guo-Zhen Wang, Hsin-Chu (TW); Han-Chang Lin, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,583

(22) Filed: Sep. 18, 2017

(65) Prior Publication Data
US 2018/0005382 A1    Jan. 4, 2018

Related U.S. Application Data

(63) Continuation-in-part of application No. 15/361,378, filed on Nov. 26, 2016, now Pat. No. 10,192,317.

(51) Int. Cl.
*G06T 7/20* (2017.01)
*G01J 5/00* (2022.01)
(Continued)

(52) U.S. Cl.
CPC ............. *G06T 7/20* (2013.01); *G01J 5/0025* (2013.01); *G06F 3/0304* (2013.01); *G06T 7/10* (2017.01);
(Continued)

(58) Field of Classification Search
CPC .. G06T 7/20; G06T 7/254; G06T 7/10; G06T 7/60; G06T 7/30; G06T 2207/30196;
(Continued)

(56) References Cited

U.S. PATENT DOCUMENTS 6,374,681 B1 * 4/2002 Vanuytven .............. G01L 1/146
73/862.046
8,773,352 B1    7/2014 Huang
(Continued)

FOREIGN PATENT DOCUMENTS

CN      101618277 A    1/2010
CN      102740003 A    10/2012
(Continued)

*Primary Examiner* — John W Lee
(74) *Attorney, Agent, or Firm* — Li & Cai Intellectual Property (USA) Office

(57) ABSTRACT

An image recognition system includes a processing module, a sensor module, and a database. The sensor module is electrically connected to the processing module. The database is electrically connected to the processing module. The sensor module configured for capturing at least one image. The at least one image is stored in the database. The processing captures a contour of an object from the at least one image and separates the contour of the object into a plurality of portions. A plurality of arrangements is defined between the portions of the contour of the object. The processing module determines a state of the contour of the object based on the arrangements.

6 Claims, 6 Drawing Sheets

(51) Int. Cl.
*G06F 3/03* (2006.01)
*G06T 7/10* (2017.01)
*G06T 7/30* (2017.01)
*G06T 7/60* (2017.01)
*G06T 7/254* (2017.01)
*H04N 5/33* (2006.01)
*G06V 10/44* (2022.01)
*G06V 10/147* (2022.01)
*G06V 40/10* (2022.01)

(52) U.S. Cl.
CPC ............... *G06T 7/254* (2017.01); *G06T 7/30* (2017.01); *G06T 7/60* (2013.01); *G06V 10/147* (2022.01); *G06V 10/44* (2022.01); *G06V 40/10* (2022.01); *H04N 5/332* (2013.01); *G06T 2207/10016* (2013.01); *G06T 2207/10048* (2013.01); *G06T 2207/30196* (2013.01)

(58) Field of Classification Search
CPC ........... G06T 2207/10048; G06T 2207/10016; G06K 9/00335; G06K 9/40; H04N 5/332; G01J 5/0025; G06F 3/0304
See application file for complete search history.

(56) References Cited

U.S. PATENT DOCUMENTS

| | | | |
|---|---|---|---|
| 9,659,403 B1 | 5/2017 | Horowitz | |
| 9,817,485 B2 | 11/2017 | Ozawa et al. | |
| 9,829,983 B2 | 11/2017 | Park et al. | |
| 9,876,966 B2 * | 1/2018 | Wang | G06F 3/0304 |
| 9,979,886 B2 | 5/2018 | Mandelli | |
| 2003/0228032 A1 * | 12/2003 | Rui | G06T 7/251 382/103 |
| 2004/0125072 A1 * | 7/2004 | Gust | G06F 3/0317 345/156 |
| 2005/0276475 A1 * | 12/2005 | Sawada | G06T 5/002 348/E3.018 |
| 2006/0266942 A1 * | 11/2006 | Ikeda | H04N 5/23238 348/E5.053 |
| 2008/0079704 A1 | 4/2008 | Joshi et al. | |
| 2008/0099678 A1 | 5/2008 | Johnson et al. | |
| 2008/0191643 A1 * | 8/2008 | Roberts | H05B 45/22 315/300 |
| 2011/0175626 A1 * | 7/2011 | Lee | G06F 1/3231 324/629 |
| 2011/0211754 A1 | 9/2011 | Litvak et al. | |
| 2013/0021507 A1 * | 1/2013 | Wang | H04N 5/35581 348/E9.002 |
| 2013/0162796 A1 * | 6/2013 | Bharara | H04N 5/23229 348/77 |
| 2013/0229491 A1 | 9/2013 | Kim et al. | |
| 2014/0111423 A1 | 4/2014 | Park et al. | |
| 2014/0253429 A1 * | 9/2014 | Dai | G06T 7/11 345/156 |
| 2014/0313294 A1 | 10/2014 | Hoffman | |
| 2015/0062306 A1 | 3/2015 | Ayyagari et al. | |
| 2016/0113517 A1 * | 4/2016 | Lee | H04N 5/23293 600/474 |
| 2016/0373676 A1 | 12/2016 | Zhang et al. | |

FOREIGN PATENT DOCUMENTS

| | | |
|---|---|---|
| CN | 103294182 A | 9/2013 |
| CN | 103677246 A | 3/2014 |

* cited by examiner

IMAGE RECOGNITION SYSTEM, SENSOR MODULE, AND METHOD FOR IMAGE RECOGNITION

CROSS-REFERENCE TO RELATED APPLICATIONS

This is a continuation-in-part application of prior application Ser. No. 15/361,378 filed on Nov. 26, 2016, currently pending.

BACKGROUND

1. Technical Field

The present disclosure relates to an image recognition system, and in particular, to an image recognition system that uses two types of sensors to capture the images.

2. Description of Related Art

In recent years, a passive infrared sensor (PIR) is used as the motion sensor for detecting a movement of one object. However, when the object is motionless, the PIR sensor cannot detect the occurrence of the object.

Therefore, providing a sensor module and an image identification to recognition the object in every state has become an important issue in the art.

SUMMARY

In order to achieve the above purposes, an image recognition system is provided in the present disclosure. The image recognition system includes a processing module; a sensor module electrically connected to the processing module; and a database electrically connected to the processing module. The sensor module configured for capturing at least one image. The at least one image is stored in the database, the processing captures a feature (Ex: contour) of an object from the at least one image and separates the feature (Ex: contour) of the object into a plurality of portions. A plurality of arrangements is defined between the portions of the feature (Ex: contour) of the object. The processing module determines a state of the feature (Ex: contour) of the object based on the arrangements.

The sensor module includes: a first sensor group electrically connected to the processing module, and being capturing a first image; and a second sensor group electrically connected to the processing module, and being capturing a second image; wherein the processing module captures a first contour of the object from the first image, and captures a second contour of the object from the second image, the processing module separates the first contour of the object into a plurality of portions, a plurality of arrangements is defined between the portions of the first contour of the object, the processing module separates the second object data into a plurality of portions, a plurality of arrangements is defined between the portions of the second contour of object, the processing module determines the state of the contour of the object based on the arraignments of the first contour of the object, the arrangements of the second contour of the object, or both of the arraignments of the first contour of the object and the arrangements of the second contour of the object.

The first sensor group includes a plurality of first sensors, and the second sensor group includes a plurality of second sensors.

The first sensor is an image sensor and the second sensor is a thermal sensor.

The first sensors and the second sensors are located in a checkerboard manner.

The first sensors and the second sensors are arranged in rows or arranged in columns.

The object is a human body.

In order to achieve the above purposes, a sensor module is provided in the present disclosure. The sensor module, wherein the sensor module electrically connected to a processing module for image recognition, the sensor module includes: a first sensor group including a plurality of first sensors, being used to capture first images; and a second sensor group including a plurality of second sensors, being used to capture second images; wherein the processing module captures a first contour of the object from the first image, and captures a second contour of the object from the second image, the processing module separates the first contour of the object into a plurality of portions, a plurality of arrangements is defined between the portions of the first contour of the object, the processing module separates the second contour of the object into a plurality of portions, a plurality of arrangements is defined between the portions of the second contour of the object, the processing module determines the state of the object based on the arraignments of the first contour of the object, the arrangements of the second contour of the object, or both of the arraignments of the first contour of the object and the arrangements of the second contour of the object.

The first sensor is an image sensor and the second sensor is a thermal sensor.

The first sensors and the second sensors are located in a checkerboard manner.

The first sensors and the second sensors are arranged in rows or being arranged in columns.

The object is a human body.

In order to achieve the above purposes, a method for image recognition is provided in the present disclosure. The method for image recognition includes: detecting whether an object is detected; capturing at least one image by the sensor module; separating a contour of the object retrieved from the image into several portions; analyzing arrangements of the portions of the contour of the object retrieved from the image; and determining a state of the contour of the object retrieved from the image based on the arrangement of the portions of the contour of the object.

According to the above, the image recognition system uses at least two types of the sensors to capture different images for image recognition. In addition, the image recognition system can detect the state of the object without movement. Moreover, both of the two types of the images can be analyzed by arrangement analyzing for enhancing the accuracy of image recognition.

In order to further understand the techniques, means and effects of the instant disclosure, the following detailed descriptions and appterminaled drawings are hereby referred to, such that, and through which, the purposes, features and aspects of the instant disclosure can be thoroughly and concretely appreciated; however, the appterminaled drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are

DESCRIPTION OF THE EXEMPLARY EMBODIMENTS

Figure 1:
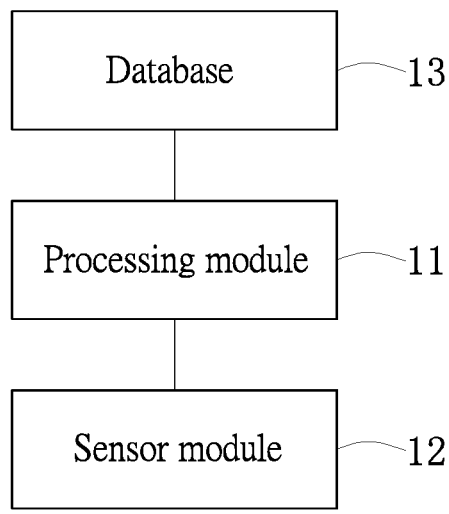
FIG. 1 is a schematic diagram of identification system of an embodiment of the present disclosure.

Reference will now be made in detail to the exemplary embodiments of the instant disclosure, examples of which are illustrated in the accompanying drawings. Wherever possible, the same reference numbers are used in the drawings and the description to refer to the same or like portions.

[The Embodiment of the Image Recognition System]

Figure 2:
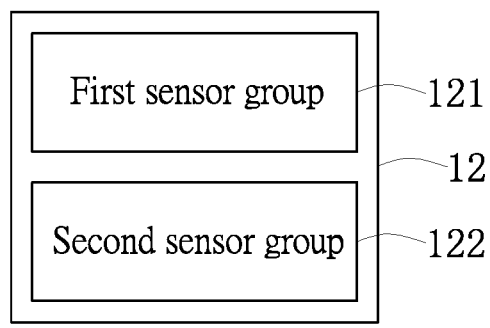
FIG. 2 is a schematic diagram of the sensor module of an embodiment of the present disclosure.
Figure 3A:
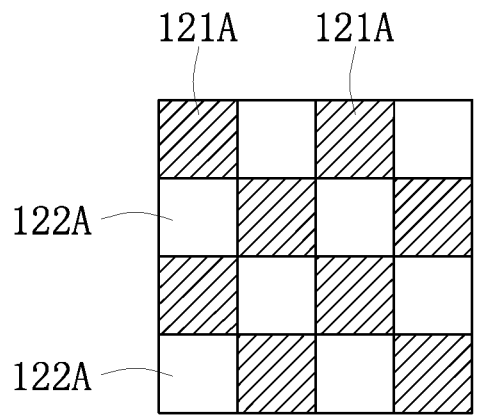
FIG. 3A is a schematic diagram of first sensors and the second sensors of the sensor module of an embodiment of the present disclosure.
Figure 3B:
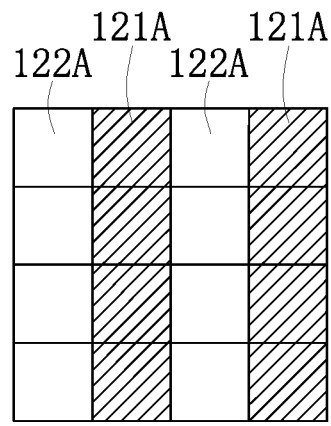
FIG. 3B is another schematic diagram of first sensors and the second sensors of the sensor module of an embodiment of the present disclosure.
Figure 3C:
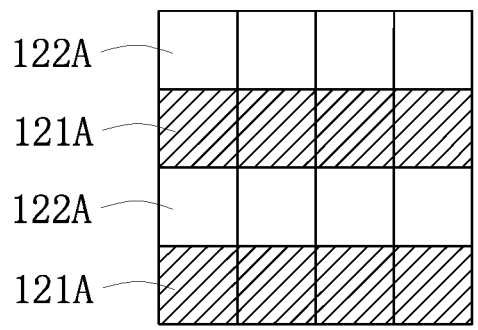
FIG. 3C is another schematic diagram of first sensors and the second sensors of the sensor module of an embodiment of the present disclosure.

Referring to FIG. 1, FIG. 2 and FIGS. 3A-3C, FIG. 1 is a schematic diagram of identification system of an embodiment of the present disclosure. FIG. 2 is a schematic diagram of the sensor module of an embodiment of the present disclosure. FIG. 3A is a schematic diagram of first sensors and the second sensors of the sensor module of an embodiment of the present disclosure. FIG. 3B is another schematic diagram of first sensors and the second sensors of the sensor module of an embodiment of the present disclosure. FIG. 3C is another schematic diagram of first sensors and the second sensors of the sensor module of an embodiment of the present disclosure.

The image recognition system 1 includes a processing module 11, a sensor module 12 and a database 13. The sensor module 12 is electrically connected to the processing module 11. The database 13 is electrically connected to the processing module 11.

In the embodiment, the sensor module 12 is used for capturing images. The images are stored in the database 13. The sensor module 12 includes a first sensor group 121 and a second sensor group 122.

In the embodiment, the first sensor group 121 includes a plurality of first sensor 121A. The second sensor group 122 includes a plurality of second sensor 122A.

In the embodiment, the first sensor 121A is a charge-coupled device, i.e., the first sensor 121A is used for capturing an image showing the colors in the visible spectrum. The second sensor 122A is a thermal sensor, such as the infrared sensor, i.e., the second sensor 122A is used for capturing a thermography. In the embodiment, the sensor module 12 is used for capturing an image of a specific environment. When a user enters or occurs in the specific environment, the sensor module 12 of the image recognition system 1 captures an image of an event that the user enters the specific environment. The processing module 11 of the image recognition system 1 can use the first sensor group 121 to capture the first image shows the colors the visible spectrum. The processing module 11 of the image recognition system 1 can use the second sensor group 122 to capture the second image that is a thermography. In other words, the first sensor 121A of the first sensor group 121 is an image sensor, and the second sensor 122A of the second sensor group 122 is a thermal sensor or an infrared sensor, but being not limited in the present disclosure.

Referring to FIG. 3A, the first sensors 121A and the second sensors 122A are arrangement in a checkerboard manner. Each first sensor 121A is adjacent to the second sensors 122A.

Referring to FIG. 3B, the first sensors and the second sensors are arranged in columns.

Referring to FIG. 3C, the first sensors and the second sensors are arranged in rows.

In other embodiment, the first sensors and the second sensors can be arranged in the other manner, but is not limited in the present disclosure.

Figure 4:
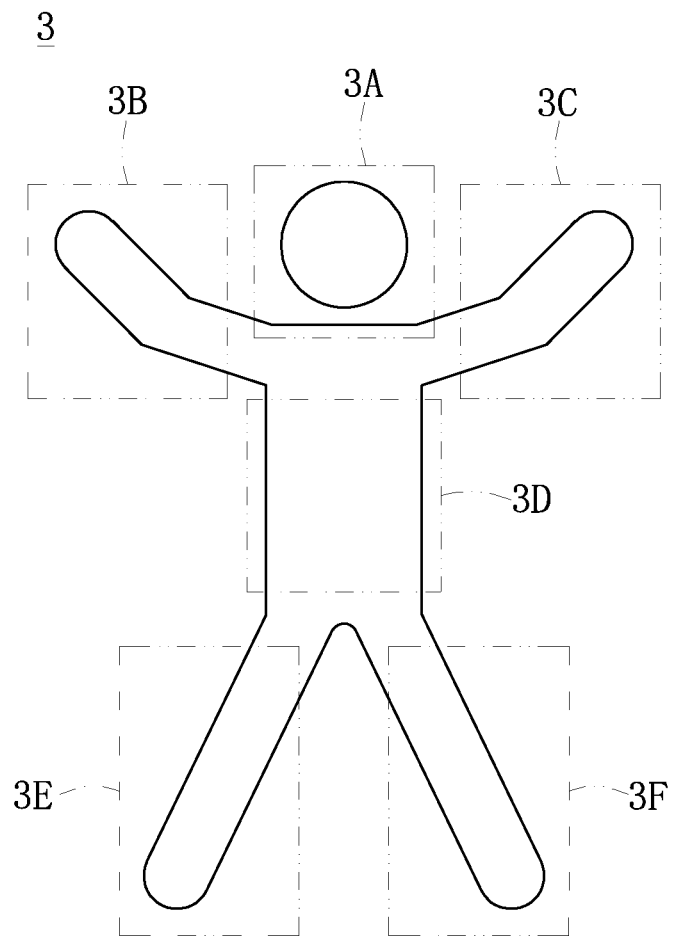
FIG. 4 is a schematic diagram of a contour of the human body of an embodiment of the present.

Referring to FIG. 4, FIG. 4 is a schematic diagram of a contour of the human body of an embodiment of the present.

A first contour and a second contour of the human body are respectively retrieved from the first image or the second image, and being analyzed by the processing module 11.

Even if the first contour of the human body and the second contour of the object retrieved from the first image and the second image are different, the first contour of the human body and the second contour of the object can be separated into several portions as shown in FIG. 4 according to the characters of each portion of the contour of the human body.

In the embodiment, the contour of the human body 3 includes a head portion 3A, a first hand portion 3B, a second hand portion 3C, a torso portion 3D, a first leg portion 3E and a second portion 3F.

For example, the head portion 3A is circle-shaped. The torso portion 3D is rectangular. The first hand portion 3B, the second hand portion 3C, the first leg portion 3E and the second leg portion 3F are rod-like. Even if the first hand portion 3B, the second hand portion 3C, the first leg portion 3E and the second leg portion 3F are similar, the arrangement of the torso portion 3D, the first hand portion 3B and the second hand portion 3C is different from that of the torso portion 3D, the first leg portion 3E and the second leg portion 3F.

As shown in FIG. 4, a plurality of arrangement can be found between the portions of the contour of the human body 3. For example, the head portion 3A generally is arranged above the torso portion 3D. The first leg portion 3E and the second leg portion 3F are arranged under the torso portion 3C.

Figure 5A:
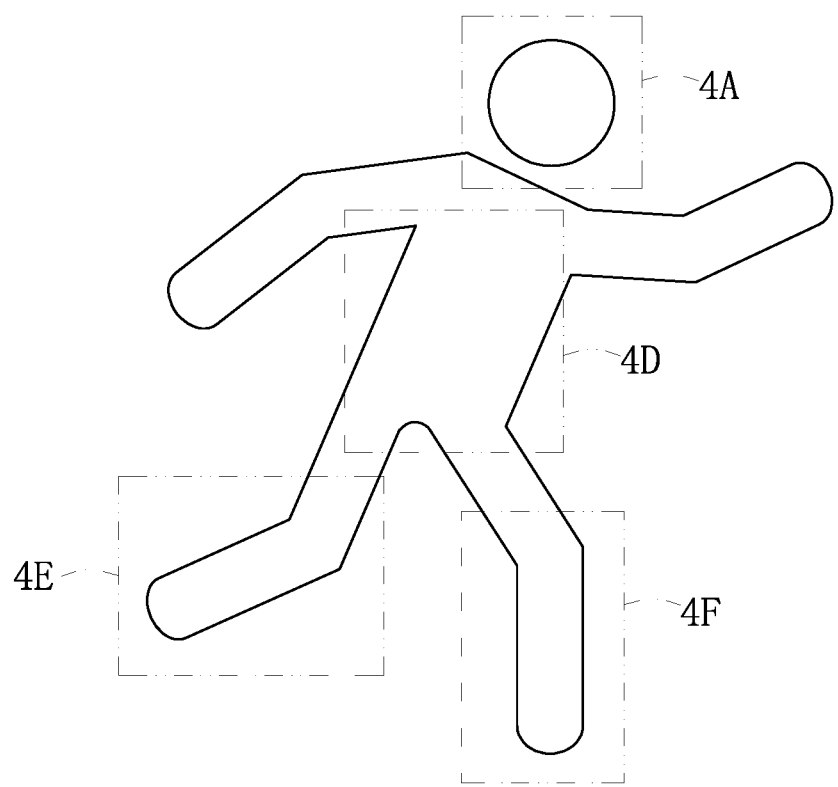
FIG. 5A is a schematic diagram of the contour of the human body in a running state of an embodiment of the present disclosure.
Figure 5B:
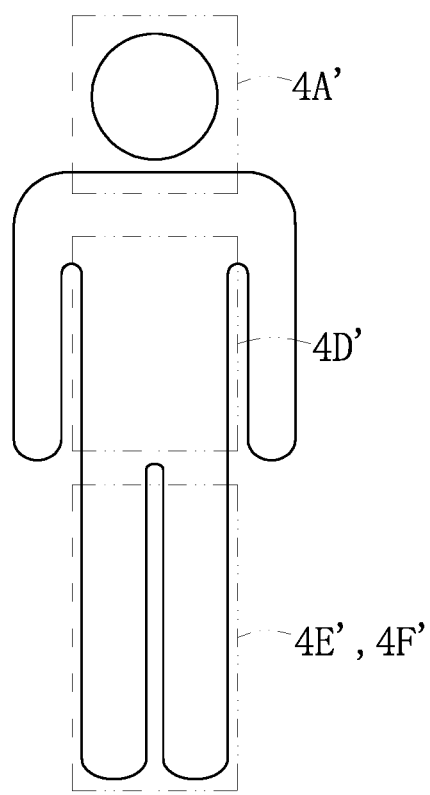
FIG. 5B is a schematic diagram of the contour of the human body in a standing state of an embodiment of the present disclosure.

Referring to FIG. 5A and FIG. 5B, FIG. 5A is a schematic diagram of the contour of the human body in a running state of an embodiment of the present disclosure. FIG. 5B is a schematic diagram of the contour of the human body in a standing state of an embodiment of the present disclosure.

Referring to FIG. 5A, the head portion 4A is arranged above the torso portion 4D, but being not in the same vertical axis. In addition, a distance is located between the first leg portion 4E and the second portion 4F. According to the above analyzing result, the state of the contour of the human body 4 can be determined to be in a running state.

As shown in FIG. 5B, the head portion 4A' of the contour of the human body 4' is arranged above the torso portion 4D', which are arranged in the same vertical axis. In addition, the first leg portion 4E' and the second leg portion 4F' are adjacent to each other. According to the above analyzing result, the state of the contour of the human body 4' can be determined to be in a standing state.

The processing module 11 determines the state of the contour of the human body 4 or the human body 4' according to the arrangement of the different portions of the contour of the human body 4 or the human body 4'. In other words, the state of the contour of the human body 4 or the human body 4' can be determined by analyzing the arrangement of the portions of the contour of the human body 4 or the human body 4'.

The arrangements of the portions of contour of the human body 4 and the human body 4' corresponding to different states can be stored in the database 13. When the processing module 11 analyzes the arrangement of the contour of the human body and an analyzing result is obtained, the processing module 11 compares the analyzing result and the arrangement of the contour of the human body 4 or the human body 4' to determine the state of the contour of the human body 4 or the human body 4'.

Therefore, the processing module 11 can transmit a state signal corresponding to the analyzing result of the processing module 11 to the other system. The other system can use the state signal to determine whether the human is in a dangerous state or in a stationary state, but is not limited in the present disclosure.

In addition, the number of the separation portions of the contour of the human body 4 can be varied base on the practical requirement, but being not limited in the present disclosure.

According to the above, different arrangements are located between the portions in each state. For example, when the contour of the human body 3 lay on the ground, the head portion 3A are adjacent to the torso portion 3D at the same surface. However, the arrangement between the head portion 3A and the torso portion 3D in the standing state is different from that in the lying state. Therefore, the arrangements in each state can be retrieved and pre-stored in the database 13.

Figure 6:
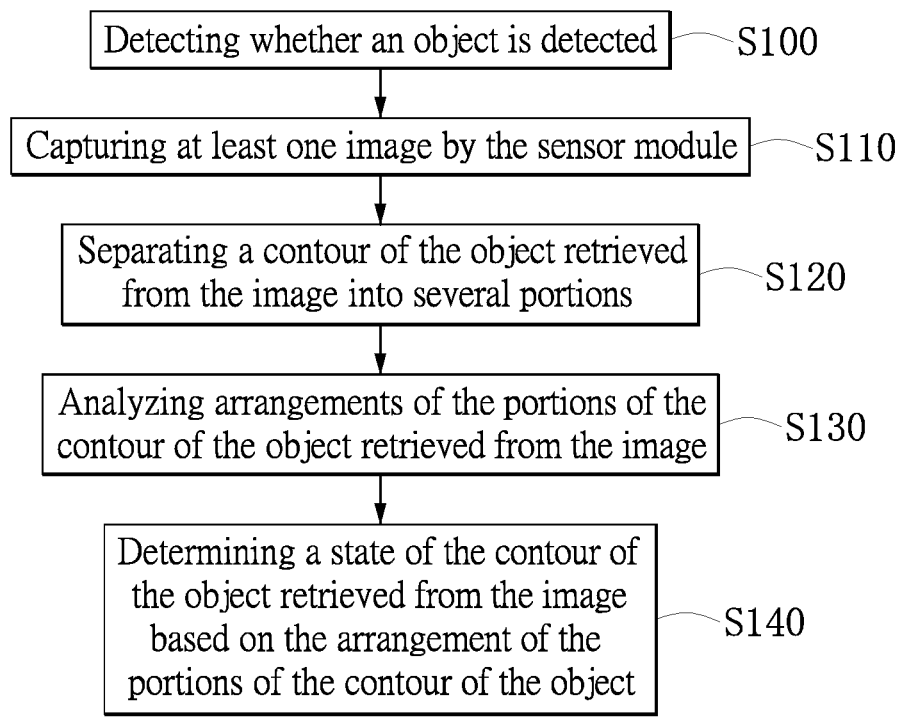
FIG. 6 is a flow chart of a method for recognizing images of an embodiment of the present disclosure.

Referring to FIG. 6, FIG. 6 is a flow chart of a method for recognizing images of an embodiment of the present disclosure.

The method for recognizing images in the embodiment includes the following steps: detecting whether an object is detected (Step S100); capturing at least one image by the sensor module (Step S110); separating a contour of the object retrieved from the image into several portions (Step 120); analyzing arrangements of the portions of the contour of the object retrieved from the image (Step S130); and determining a state of the contour of the object retrieved from the image based on the arrangement of the portions of the contour of the object (Step S140).

In the embodiment, the method for recognizing images can be used in the image recognition system 1 of the above embodiment. The structure and the function of the identification system are omitted in the embodiment.

In Step S100, the sensor module 12 is used for capturing an image of a specific environment. When a user enters or occurs in the specific environment, the sensor module 12 of the image recognition system 1 captures at least one image of an event that the user enters the specific environment. In other embodiment, the sensor module 12 can periodically capture the image of the specific environment, and the captured image is transmitted to the processing module 11 to be analyzed.

In Step S110, in the embodiment, the sensor module 12 includes a first sensor group 121 and a second sensor group 122. The processing module 11 of the image recognition system 1 can use the first sensor group 121 to capture the image shows the colors the visible spectrum. The processing module 11 of the image recognition system 1 can use the second sensor group 122 to capture the thermography. In other words, the first sensor 121A of the first sensor group 121 is an image sensor, and the second sensor 122A of the second sensor group 122 is a thermal sensor or an infrared sensor, but being not limited in the present disclosure.

In Step S120, a contour of the human body is retrieved from the first image captured by the first sensor group 121 or the second image captured by the second sensor group 122, and being analyzed by the processing module 11. The contours retrieved from the first image and the second image can be separated into several portions as shown in FIG. 4 according to the characters of each portion of the contour of the human body. In the embodiment, the object is a human body. In other embodiment, the object can be a cat, a dog, or other animal or a specific product, but is not limited thereto.

In addition, the number of the separation portions of the contour of the human body 4 can be varied base on the practical requirement, but is not limited thereto. In the embodiment, the contour of the human body 3 includes a head portion 3A, a first hand portion 3B, a second hand portion 3C, a torso portion 3D, a first leg portion 3E and a second leg portion 3F. For example, the head portion 3A is circle-shaped. The torso portion 3D is rectangular. The first hand portion 3B, the second hand portion 3C, the first leg portion 3E and the second leg portion 3F are rod-like.

In Step S130 and Step S140, even if the first hand portion 3B, the second hand portion 3C, the first leg portion 3E and the second leg portion 3F are similar shape, the arrangement of the torso portion 3D, the first hand portion 3B and the second hand portion 3C is different from that of the torso portion 3D, the first leg portion 3E and the second leg portion 3F. As shown in FIG. 4, a plurality of arrangement can be found between the portions of the contour of the human body 3. For example, the head portion 3A generally is arranged above the torso portion 3D. The first leg portion 3E and the second leg portion 3F are arranged under the torso portion 3D.

Referring to FIG. 5A, the head portion 4A is arranged above the torso portion 4D, but being not in the same vertical axis. In addition, a distance is located between the first leg portion 4E and the second leg portion 4F. According to the above analyzing result, the state of the contour of the human body 4 can be determined to be in a running state. As shown in FIG. 5B, the head portion 4A' of the contour of the human body 4' is arranged above the torso portion 4D', which are arranged in the same vertical axis. In addition, the first leg portion 4E' and the second leg portion 4F' are adjacent to each other. According to the above analyzing result, the state of the contour of the human body 4' can be determined to be in a standing state.

The processing module 11 determines the state of the contour of the human body 4 or the human body 4' according to the arrangement of the different portions of the contour of the human body 4 or the human body 4'. In other words, the state of the contour of the human body 4 or the human body 4' can be determined by analyzing the arrangement of the portions of the contour of the human body 4 or the human body 4'.

The arrangements of the portions of contour of the human body 4 and the human body 4' corresponding to different states can be stored in the database 13. When the processing module 11 analyzes the arrangement of the contour of the human body and an analyzing result is obtained, the processing module 11 compares the analyzing result and the arrangement of the contour of the human body 4 or the human body 4' to determine the state of the contour of the human body 4 or the human body 4'.

Therefore, the processing module 11 can transmit a state signal corresponding to the analyzing result of the processing module 11 to the other system. The other system can use the state signal to determine whether the human is in a dangerous state or in a stationary state, but is not limited in the present disclosure.

According to the above, the image recognition system uses at least two types of the sensors to capture different images for image recognition. In addition, the image recognition system can detect the state of the object without movement. Moreover, both of the two types of the images can be analyzed by arrangement analyzing for enhancing the accuracy of image recognition.

The above-mentioned descriptions represent merely the exemplary embodiments of the instant disclosure, without any intention to limit the scope of the instant disclosure thereto. Various equivalent changes, alterations or modifications based on the claims of present disclosure are all consequently viewed as being embraced by the scope of the instant disclosure.

What is claimed is:

1. An image recognition system comprising:
   a processing module;
   a sensor module electrically connected to the processing module; and
   a database electrically connected to the processing module;
   wherein the sensor module captures at least two images, the at least two images are stored in the database, the processing module captures contours of an object from the at least two images and separates the contour of the object into a plurality of portions;
   wherein a plurality of arrangements is defined between the portions of the contour of the object, the processing module determines a state of the contour of the object based on the arrangements;
   wherein the sensor module includes a plurality of first sensors and a plurality of second sensors, the first sensors are image sensors for object recognition and the second sensors are thermal sensors for human detection, the first sensors and the second sensors are arranged in a matrix, numbers of the first sensor and the second sensor are more than or equal to two, the first sensors and the second sensors are formed in the same plane;
   wherein the at least two images are captured by the first sensors and the second sensors respectively;
   wherein, when the image sensors and the thermal sensors are arranged in columns, each column of the image sensors is adjacent to at least one column of the thermal sensors, or when the image sensors and the thermal sensors are arranged in rows, each row of the image sensors is adjacent to at least one row of the thermal sensors, or when the image sensors and the thermal sensors are arranged in a checkerboard manner in the matrix, each of the image sensors is adjacent to the thermal sensors.

2. The image recognition system of claim 1, wherein
   the first sensors are electrically connected to the processing module,
   the second sensors electrically connected to the processing module;
   wherein the processing module captures a first contour of the object from the first image, and captures a second contour of the object from the second image, the processing module separates the first contour of the object into a plurality of portions, a plurality of arrangements is defined between the portions of the first contour of the object, the processing module separates the second object data into a plurality of portions, a plurality of arrangements is defined between the portions of the second contour of object, the processing module determines the state of the contour of the object based on the arraignments of the first contour of the object, the arrangements of the second contour of the object, or both of the arraignments of the first contour of the object and the arrangements of the second contour of the object.

3. The image recognition system of claim 1, wherein the object is a human body.

4. A sensor module, the sensor module electrically connected to a processing module for image recognition, the sensor module comprising:
   a plurality of first sensors, being used to capture first images for object recognition; and
   a plurality of second sensors, being used to capture second images for human detection, the first sensors and the second sensors are arranged in a matrix, numbers of the first sensor and the second sensor are more than or equal to two, the first sensors and the second sensors formed in the same plane;
   wherein the processing module captures a first contour of the object from the first image, and captures a second contour of the object from the second image, the processing module separates the first contour of the object into a plurality of portions, a plurality of arrangements is defined between the portions of the first contour of the object, the processing module separates the second contour of the object into a plurality of portions, a plurality of arrangements is defined between the portions of the second contour of the object, the processing module determines the state of the object based on the arraignments of the first contour of the object, the arrangements of the second contour of the object, or both of the arraignments of the first contour of the object and the arrangements of the second contour of the object;
   wherein the first sensor is an image sensor and the second sensor is a thermal sensor;
   wherein, when the first sensors and the second sensors are arranged in columns, each column of the first sensors is adjacent to at least one column of the second sensors, or when the first sensors and the second sensors are arranged in rows, each row of the first sensors is adjacent to at least one row of the second sensors, or when the first sensors and the second sensors are arranged in a checkerboard manner in the matrix, each of the first sensors is adjacent to the second sensors.

5. The sensor module of claim 4, wherein the object is a human body.

6. A method for image recognition comprising:
  detecting whether an object is detected;
  capturing at least two images by a sensor module, wherein the sensor module includes a plurality of first sensors and a plurality of second sensors, the first sensors are image sensors for object recognition and the second sensors are thermal sensors for human detection, the first sensors and the second sensors are arranged in a matrix, numbers of the first sensor and the second sensor are more than or equal to two, the first sensors and the second sensors formed in the same plane;
  separating contours of the object retrieved from the at least two images into several portions;
  analyzing arrangements of the portions of the contours of the object retrieved from the at least two images; and
  determining a state of the contour of the object retrieved from the at least two images based on the arrangement of the portions of the contour of the object;
  wherein, when the first sensors and the second sensors are arranged in columns, each column of the first sensors is adjacent to at least one column of the second sensors, or when the first sensors and the second sensors are arranged in rows, each row of the first sensors is adjacent to at least one row of the second sensors, or when the first sensors and the second sensors are arranged in a checkerboard manner in the matrix, each of the first sensors is adjacent to the second sensors.

* * * * *